United States Patent
Narendra et al.

(10) Patent No.: US 11,776,153 B2
(45) Date of Patent: Oct. 3, 2023

(54) METHOD, SYSTEM AND APPARATUS FOR MOBILE DIMENSIONING

(71) Applicant: ZEBRA TECHNOLOGIES CORPORATION, Lincolnshire, IL (US)

(72) Inventors: Patrenahalli M. Narendra, Hoffman Estates, IL (US); Dae Suk Noh, Vernon Hills, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/596,297

(22) Filed: Oct. 8, 2019

(65) Prior Publication Data
US 2021/0104061 A1    Apr. 8, 2021

(51) Int. Cl.
*G06T 7/73* (2017.01)
*G06T 7/246* (2017.01)
*G01C 3/02* (2006.01)

(52) U.S. Cl.
CPC .......... *G06T 7/73* (2017.01); *G01C 3/02* (2013.01); *G06T 7/246* (2017.01)

(58) Field of Classification Search
CPC .. G06T 7/73; G06T 7/246; G06T 7/10; G06T 7/13; G06T 7/33; G01C 3/02
See application file for complete search history.

(56) References Cited

U.S. PATENT DOCUMENTS

| | | | |
|---|---|---|---|
| 2010/0074473 A1* | 3/2010 | Kotaba | G06T 7/246 382/106 |
| 2011/0288818 A1 | 11/2011 | Thierman et al. | |
| 2013/0249784 A1 | 9/2013 | Gustafson et al. | |
| 2013/0329211 A1* | 12/2013 | McHale | F41G 3/065 356/4.01 |
| 2015/0223730 A1 | 8/2015 | Ferrantelli | |
| 2015/0313380 A1* | 11/2015 | Hagglund | G01G 21/23 248/542 |
| 2016/0174846 A9 | 6/2016 | Ferrantelli | |
| 2019/0026919 A1* | 1/2019 | Aratani | G02B 27/0172 |

(Continued)

OTHER PUBLICATIONS

International Search Report and Written Opinion for International Application No. PCT/US2020/051075 dated Dec. 10, 2020.

(Continued)

*Primary Examiner* — John Villecco
*Assistant Examiner* — Han Hoang (57) ABSTRACT

A mobile device includes a rangefinder to measure ranges to points external to the device; a tracking sensor; and a controller connected with the rangefinder and the tracking sensor, the controller configured to: track successive poses of the mobile device in a frame of reference via the tracking sensor; responsive to a first activation of the rangefinder at a first one of the poses, generate a first position, in the frame of reference, of a first external point based on a first range from the rangefinder and the first pose; responsive to a second activation of the rangefinder at a second one of the poses, generate a second position, in the frame of reference, of a second external point based on a second range from the rangefinder and the second pose; and determine a distance between the first and second external points based on the first and second positions.

16 Claims, 9 Drawing Sheets

(56) References Cited

U.S. PATENT DOCUMENTS

2020/0184656 A1* 6/2020 Murphy-Chutorian ...................... G06T 7/73
2020/0242793 A1* 7/2020 Fernandez-Dorado ...................... G01B 11/026

OTHER PUBLICATIONS

Li et al. "Real-time motion tracking on a cellphone using inertial sensing and a rolling-shutter camera." In: 2013 IEEE International Conference or Robotics and Automation. May 10, 2013 (May 10, 2013) Retrieved on Feb. 18, 2021 (Feb. 18, 2021) from <URL: https://ieeexplore.ieee.org/document/6631248>entire document.

* cited by examiner

METHOD, SYSTEM AND APPARATUS FOR MOBILE DIMENSIONING

BACKGROUND

Measuring dimensions of objects may be necessary in a wide variety of applications. For example, packages in a warehouse may be dimensioned prior to shipping. Objects to be dimensioned may, however, vary widely in size, and may also be located at variable distances from the operator performing the dimensioning. Dimensioning systems may be unable to accommodate such variability, or may suffer from reduced dimensioning accuracy.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a mobile device, comprising: a tracking sensor; and a controller connected with the tracking sensor, the controller configured to: track successive poses of the mobile device in a frame of reference via the tracking sensor; at a first one of the poses, receive a first range value indicating a first distance between the mobile device and a first external point; generate a first position, in the frame of reference, of the first external point based on the first range value and the first pose; at a second one of the poses, receive a second range value indicating a second distance between the mobile device and a second external point, and generate a second position, in the frame of reference, of the second external point based on the second range value and the second pose; and determine a distance between the first and second external points based on the first and second positions.

Additional examples disclosed herein are directed to a method for mobile dimensioning, comprising: at a controller of a mobile device, controlling a tracking sensor to track successive poses of the mobile device in a frame of reference; at the controller, receiving a first range value indicating a first distance between the mobile device and a first point external to the mobile device; at the controller, receiving a second range value indicating a second distance between the mobile device and a second point external to the mobile device; at the controller, generating a first position, in the frame of reference, of the first external point based on the first range value and the first pose; at the controller, generating a second position, in the frame of reference, of the second external point based on the second range value and the second pose; and at the controller, determining a distance between the first and second external points based on the first and second positions.

Further examples disclosed herein are directed to a device comprising: a rangefinder; a dimensioning controller connected to the rangefinder, the dimensioning controller configured to: obtain a first range value indicating a first distance between the mobile device and a first point external to the device; obtain, in a frame of reference, a first pose of a mobile device corresponding to the first range value; obtain a second range value indicating a second distance between the mobile device and a second point external to the device; obtain, in a frame of reference, a second pose of a mobile device corresponding to the second range value; generate a first position, in the frame of reference, of the first external point based on the first range value and the first pose; generate a second position, in the frame of reference, of the second external point based on the second range value and the second pose; and determine a distance between the first and second external points based on the first and second positions.

Figure 1:
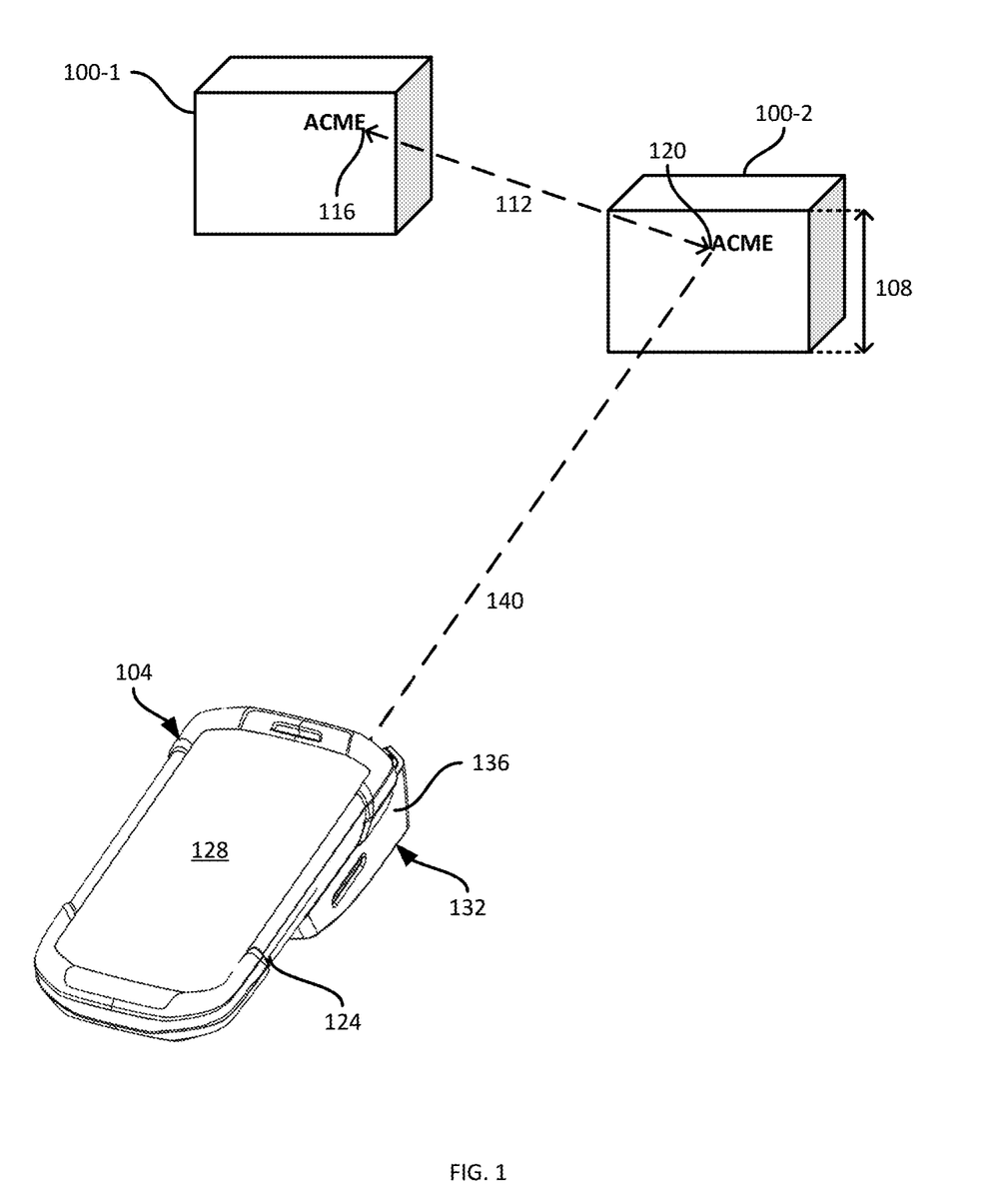
FIG. 1 is a diagram illustrating a mobile computing device for mobile dimensioning.

FIG. 1 depicts a pair of objects 100-1 and 100-2, such as items (e.g. boxes or other packages) in a transport and logistics facility. The technology described herein can also be implemented in association with a wide variety of other objects, including internal and external surfaces of buildings, furniture, and the like. FIG. 1 also illustrates a mobile computing device 104 (also referred to herein as the mobile device 104 or simply the device 104) that is enabled to measure a distance associated with at least one of the objects 100. More generally, as will be apparent in the discussion below, the device 104 is enabled to measure any of a wide variety of distances associated with any of the above-mentioned objects, including the objects 100 shown in FIG. 1.

In other words, the device 104 is enabled to measure distances between pairs of points external to the device 104 itself. The points can define an edge of an object 100 (e.g. a height 108 of the object 100-2), a distance between edges of distinct objects, a distance between arbitrary points on a given object, and the like. FIG. 1, for example, illustrates a distance 112 between a point 116 on the object 100-1 and a point 120 on the object 100-2.

As will be apparent to those skilled in the art, other dimensioning systems may be poorly suited to measuring some of the above distances (e.g. the distance 112). For example, systems that rely on the capture of images of the objects to be measured and the detection of edges may be unable to measure distances between arbitrary points on separate objects, such as the distance 112. Further, such systems may be vulnerable to inaccurate measurements due to parallax error, image capture quality and the like.

Further systems employ range-finding devices mounted on angular resolvers, which in turn are fixed to a stable surface (e.g. the ground). To calculate a distance between two external points, such a system is employed to capture a first range measurement to one point, and rotate the rangefinder to face the second point and capture a second range measurement. The degree of rotation is captured by the angular resolver, and trigonometric principles can be applied to calculate the distance between the two external points (e.g. based on the angle of rotation and the two ranges). Such systems, however, may be costly (e.g. due to the need for highly accurate angular resolvers) and time-consuming to set up and calibrate. Such systems may also be subject to constraints on their range of motion. The device 104, in contrast to the above systems, implements functionality enabling the measurement of a wide variety of distances while permitting free movement of the device 104 (e.g. during handheld operation), without requiring additional hardware such as an angular resolver.

The device 104 includes a device housing 124 that supports various other components of the device 104, including a display 128. The device 104 also includes a rangefinder 132, which may be integrated with the housing 124, or as illustrated in FIG. 1, supported by a separate accessory housing 136 that is removably coupled to the device housing 124. The rangefinder 132 can implement any of a variety of suitable range-finding technologies. In the present example, the rangefinder 132 is a laser rangefinder, and thus emits a beam 140 of laser light and determines, based on reflections of the beam 140 from an external point (e.g. the point 120 in FIG. 1), a range from the rangefinder 132 to the external point. Other examples of range-finding technologies that can be employed by the rangefinder 132 include ultrasound, and the like.

As will be discussed below in greater detail, the device 104 tracks its current pose (i.e. the position and orientation of the device 104) in three dimensions, and also obtains ranges via the rangefinder 132, between the device 104 and external points such as the points 116 and 120. As will be apparent, obtaining ranges for different points requires movement of the device 104. Based on the above-mentioned pose tracking and range measurements, the device 104 generates three-dimensional coordinates for each external point. The three-dimensional coordinates can then be employed by the device 104 to measure distances between the points, such as the distance 112 between the points 116 and 120. Before discussing the functionality implemented by the device 104, certain components of the device 104 will be described, with reference to FIGS. 2, 3 and 4.

Figure 2:
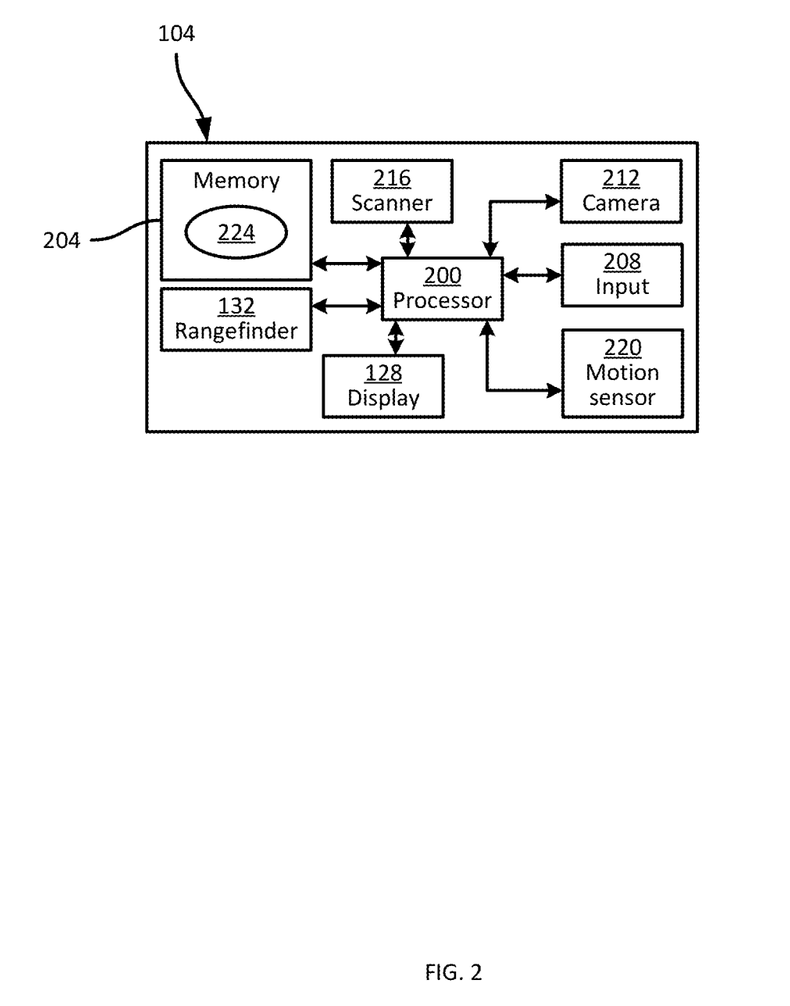
FIG. 2 is a block diagram of certain internal hardware components of the mobile computing device of FIG. 1.

Referring to FIG. 2, a block diagram of certain components of the device 104 is illustrated. The device 104 includes a special-purpose controller, such as a processor 200, interconnected with a non-transitory computer readable storage medium, such as a memory 204. The memory 204 includes a combination of volatile memory (e.g. Random Access Memory or RAM) and non-volatile memory (e.g. read only memory or ROM, Electrically Erasable Programmable Read Only Memory or EEPROM, flash memory). The processor 200 and the memory 204 each comprise one or more integrated circuits.

The device 104 also includes at least one input device 208 interconnected with the processor 200. The input device 208 is configured to receive input (e.g. from an operator of the device 104) and provide data representative of the received input to the processor 200. The input device 208 includes any one of, or a suitable combination of, a touch screen integrated with the display 128, a keypad, a trigger button, a microphone, and the like. In addition, the device 104 includes a camera 212 including a suitable image sensor or combination of image sensors. The camera 212 is configured to capture a sequence of images (e.g. a video stream) for provision to the processor 200 and subsequent processing to track the pose of the device 104.

The device 104 can also include a scanning assembly 216 (also simply referred to as a scanner 216), such as a barcode scanner. The scanner 216 can be an image-based scanner, and thus include further image sensors in addition to those mentioned above in connection with the camera 212. In other examples, the scanner 216 is a laser-based scanner.

In addition to the display 128, the device 104 can also include one or more other output devices, such as a speaker, a notification LED, and the like (not shown). Further, the device 104 includes a motion sensor 220, such as an inertial measurement unit (IMU) including one or more accelerometers, one or more gyroscopes, and/or one or more magnetometers. The motion sensor 220 is configured to generate data indicating detected movement of the device 104 and provide the data to the processor 200, for processing along with the images from the camera 212 to track the current pose of the device 104. Therefore, the camera 212 and the motion sensor 220 may also be referred to as a tracking sensor. As will be apparent to those skilled in the art, other combinations of image sensors and/or motion sensors can be employed to implement a tracking sensor.

The memory 204 stores computer readable instructions for execution by the processor 200. In particular, the memory 204 stores a dimensioning application 224 (also referred to simply as the application 224) which, when executed by the processor 200, configures the processor 200 to perform various functions discussed below in greater detail and related to the tracking of the pose of the device 104 and the generation of three-dimensional positions for external points based on the tracked pose and range measurements. The application 224 may also be implemented as a suite of distinct applications in other examples.

The processor 200, when so configured by the execution of the application 224, may also be referred to as a dimensioning controller 200. Those skilled in the art will appreciate that the functionality implemented by the processor 200 via the execution of the application 224 may also be implemented by one or more specially designed hardware and firmware components, such as FPGAs, ASICs and the like in other embodiments. In further embodiments, some or all of the functionality of the dimensioning controller 200 may be implemented by a microcontroller of the rangefinder 132. The term "dimensioning controller" may therefore refer to the processor 200 (as configured via execution of the application 224), the rangefinder 132 controller, or a combination thereof.

Figure 3:
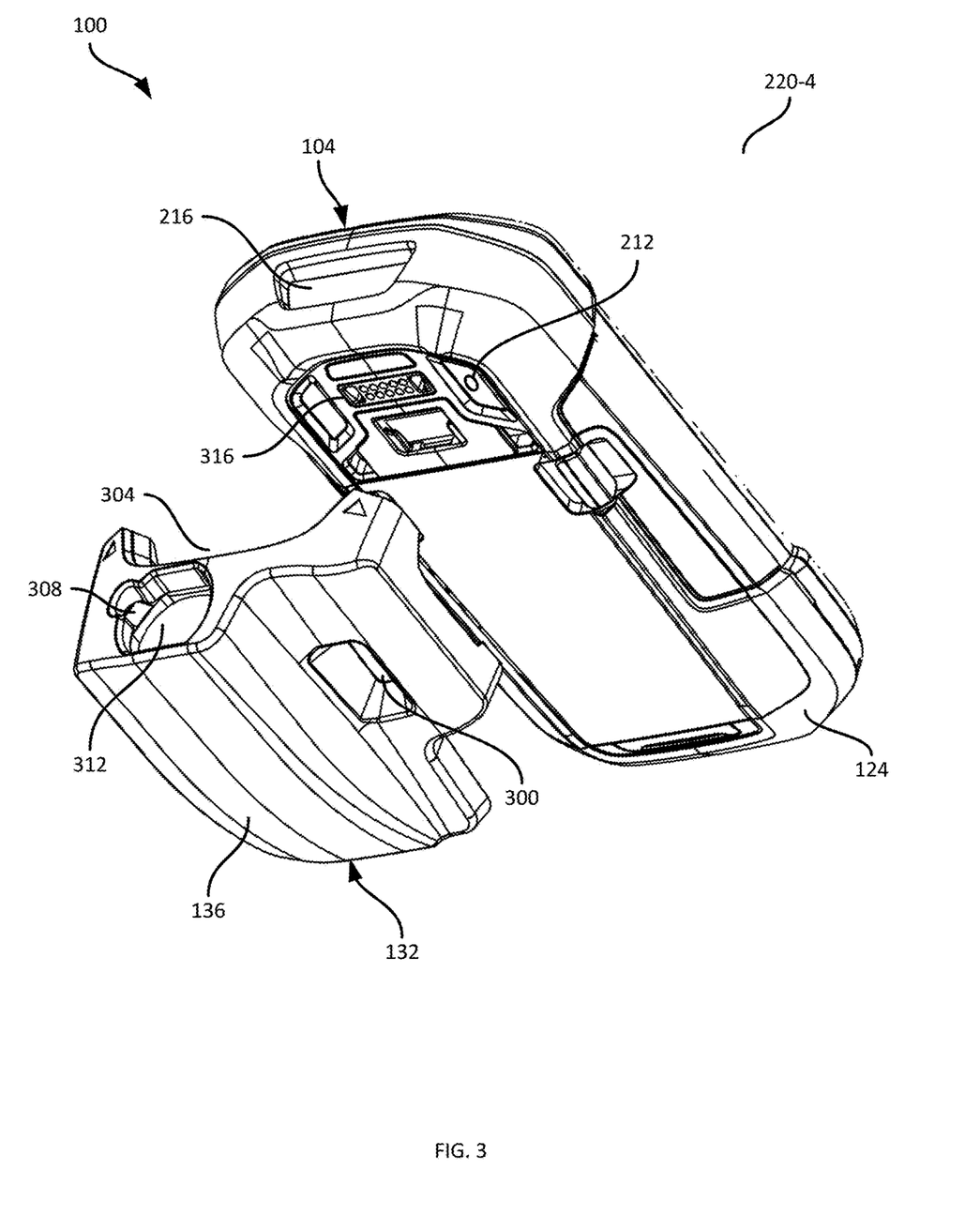
FIG. 3 is an exploded view of the mobile computing device of FIG. 1, seen from the bottom.

Turning to FIG. 3, an exploded view of the device 104 is shown from the bottom, illustrating certain additional features of the device 104. In particular, the position of the camera 212 in the present example is illustrated, on a rear (i.e. facing away from the display 128) surface of the device housing 124. In other examples, additional cameras may be placed on other locations of the device housing 124. The accessory housing 136 is shaped and dimensioned to cooperate with a rear portion of the device housing 124, to removably couple the accessory housing 136 to the device housing 124 in a predefined position (i.e. such that the position of the rangefinder 132 relative to the device housing 124 is substantially identical whenever the rangefinder 132 is coupled to the device housing 124). The accessory housing 136 includes an opening 300 therethrough that is disposed around the camera 212 when the rangefinder 132 is coupled with the device housing 124, permitting continued use of the camera 212.

The accessory housing 136 also includes a cutout 304 to accommodate a sensor window of the scanner 216 when the rangefinder 132 is coupled with the device housing 124. As seen in FIG. 3, the rangefinder 132 includes a laser emitter 308, configured to emit the beam 140 shown in FIG. 1, and a sensor 312 to detect reflections from the beam 140. The rangefinder 132 also includes a controller, which may be distinct from the processor 200 or may be implemented by the processor 200, that determines a range measurement from the above-mentioned reflections.

Figure 4:
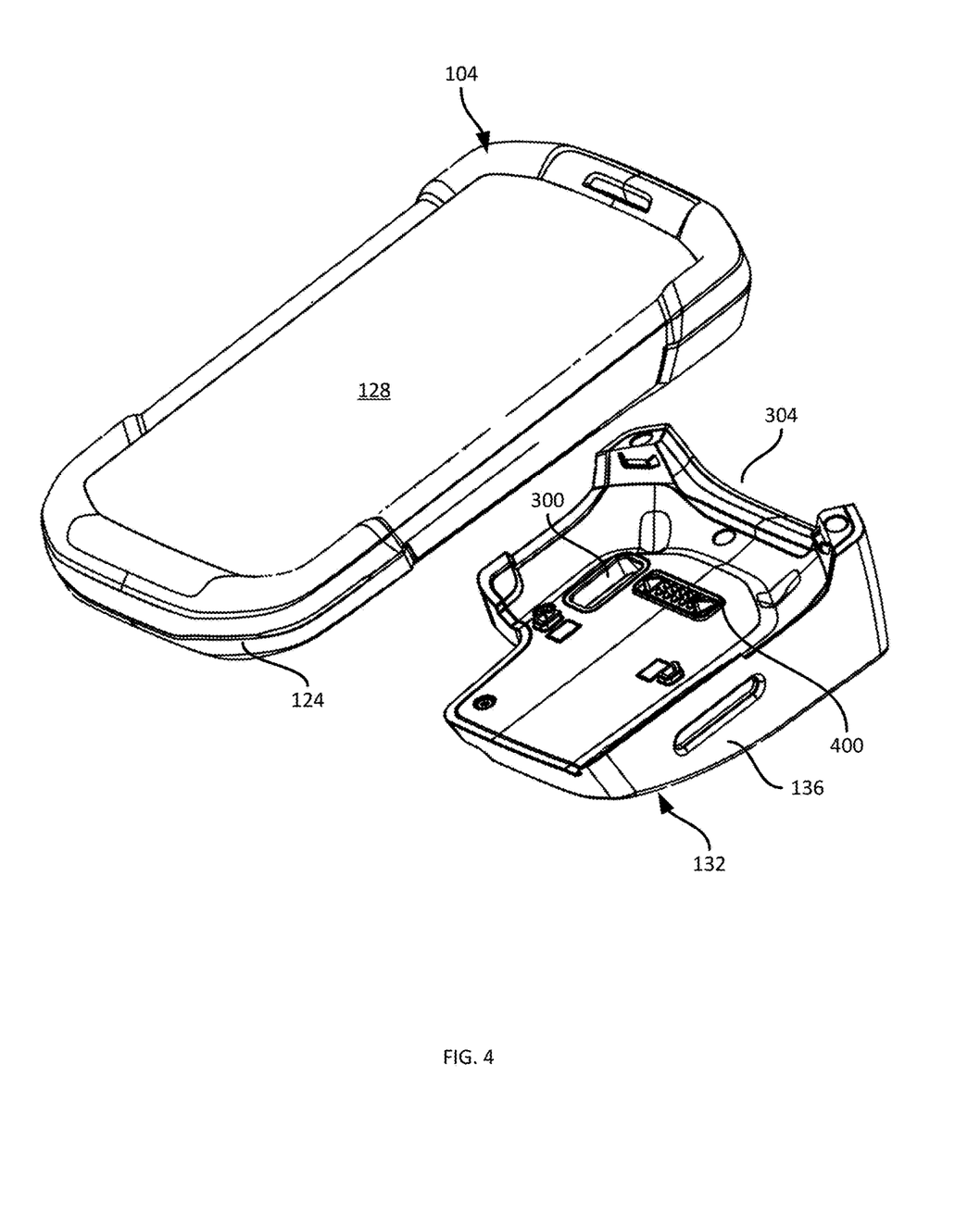
FIG. 4 is an exploded view of the mobile computing device of FIG. 1, seen from the top.

The device housing 124 and the accessory housing 136 are provided with cooperating communications interfaces, permitting control signals and range measurements to travel between the rangefinder 132 and the processor. In the present example, the interface includes a plurality of data and/or power contacts 316 on a rear surface of the device housing 124, connected to the processor 200. Turning to FIG. 4, a corresponding interface on an inner surface of the accessory housing 136 carries a plurality of pins (e.g. pogo pins) 400 that engage with the contacts 316 when the accessory housing 136 is coupled with the device housing 124.

Figure 5:
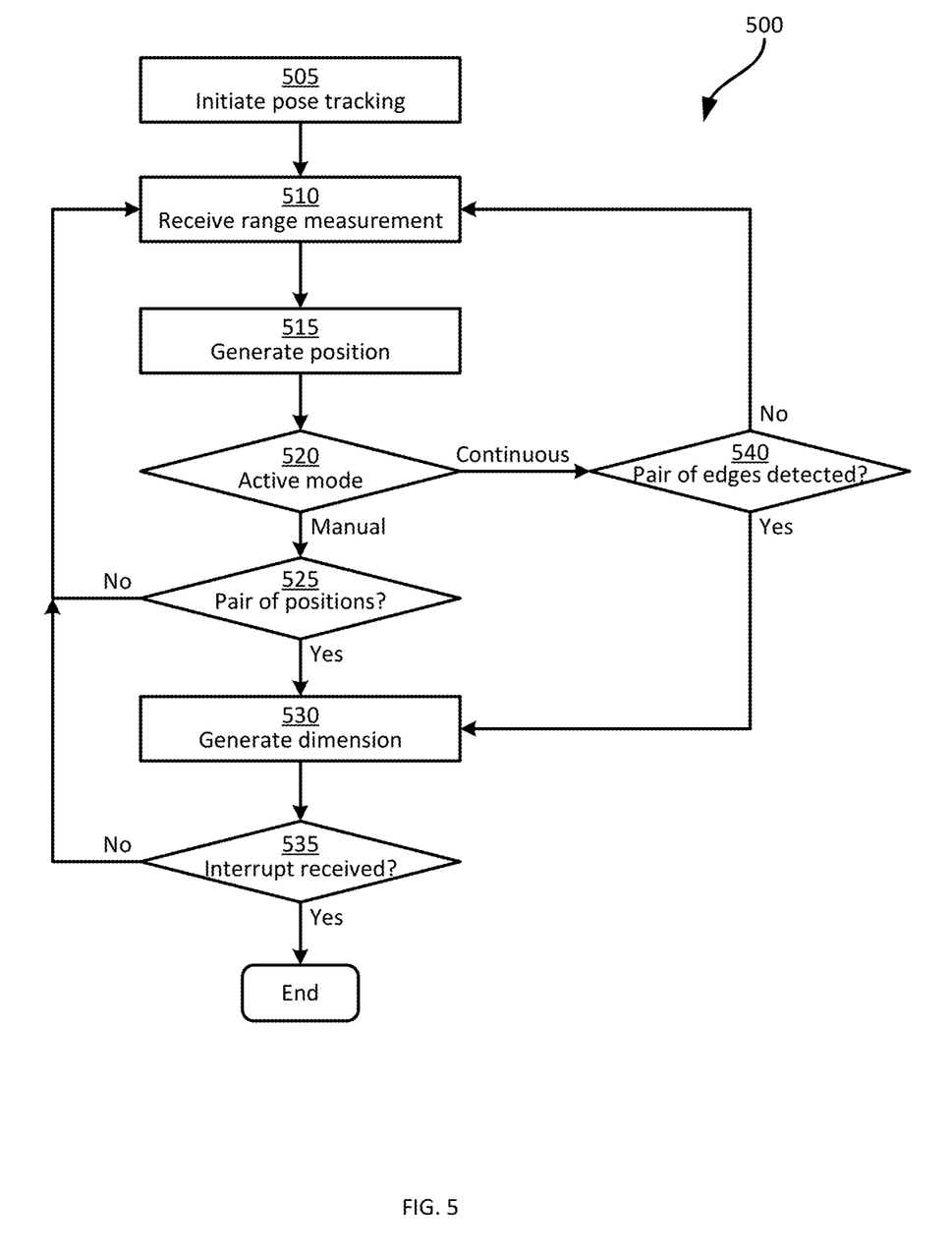
FIG. 5 is a flowchart of a method of mobile dimensioning.

Turning now to FIG. 5, the functionality implemented by the device 104 will be discussed in greater detail. FIG. 5 illustrates a dimensioning method 500, which will be discussed below in conjunction with its performance by the device 104.

At block 505, the device 104 initiates pose tracking. That is, the device 104 begins tracking successive poses (i.e. positions and orientations of the device 104 in three dimensions), at any suitable frequency (e.g. at a frequency of about 30 or 60 Hz, although a wide variety of other pose estimation frequencies can also be employed). The frequency with which pose estimates are generated by the device 104 may depend, for example, on the frame rate of the camera 212 and/or the sampling frequency of the motion sensor 220. Pose tracking can be initiated responsive to receiving an input command, e.g. from the operator of the device 104, via the input device 208.

To track the pose of the device 104, the processor 200 controls the tracking sensor to capture data representing the surroundings of the device 104, as well as motion of the device 104. In the present example, the processor 200 controls the camera 212 to begin capturing a stream of images and providing the images to the processor 200. The processor 200 also controls the motion sensor 220 to provide motion data (e.g. defining accelerations affecting the device 104, as well as changes in orientation of the device 104). The processor 200 detects one or more image features in the images from the camera 212, and tracks the changes in position of such features between images. Examples of features include corners, edges (e.g. changes in gradient) and the like detectable via any suitable feature-detection algorithms. The movement of such features between images is indicative of movement of the device 104.

The positions of the above-mentioned image features, as well as motion data from the motion sensor 220, can be provided as inputs to a pose estimator implemented by the processor 200, such as a Kalman filter. Various mechanisms will occur to those skilled in the art to combine image and/or motion sensor data to generate pose estimations. Examples of such mechanisms include those implemented by the ARCore software development kit provided by Google LLC, and the ARKit software development kit provided by Apple Inc.

Figure 6:
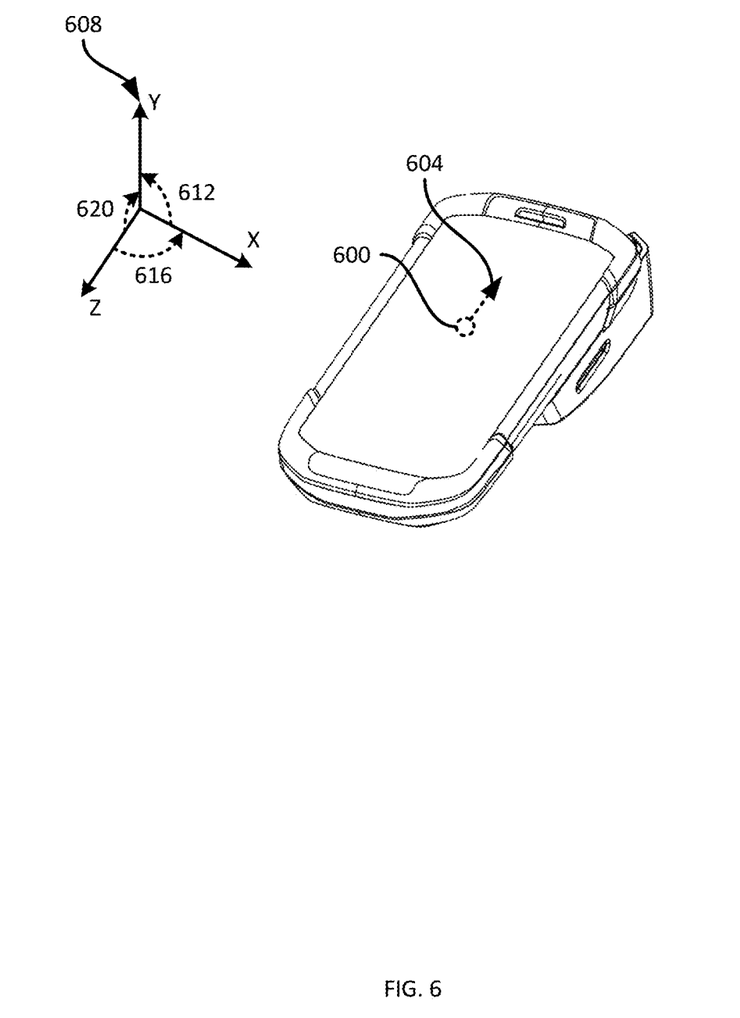
FIG. 6 is a diagram illustrating a performance of block 505 of the method of FIG. 5.

Turning to FIG. 6, an example pose estimate is illustrated as determined at block 505, including a location 600 and an orientation 604. The location 600 represents the location of a centroid of the device 104, but in other embodiments, the location 600 can correspond to a different point of the device 104. The orientation 604 represents the direction in which the front of the device 104 (e.g. the forward surface, bearing the scanner 216 shown in FIG. 3) is currently facing. The location 600 and orientation 604 are defined relative to a three-dimensional frame of reference 608. In particular, the location 600 is defined by positions along each of the three axes of the frame of reference 608, and the orientation 604 is defined by angles in each of three planes (an angle 612 in the XY plane, an angle 616 the XZ plane, and an angle 620 in the ZY plane). The origin of the frame of reference 608 is defined arbitrarily by the device 104 when the performance of block 505 begins. For example, the origin of the frame of reference 608 may be set as the current location of the centroid of the device 104. Thus, the first tracked pose upon initiation of pose tracking may have a location of [0, 0, 0], indicating that the device 104 is at the origin of the frame of reference 608.

Pose tracking at block 505, once initiated, is performed continuously throughout the remainder of the method 500. Therefore, referring again to FIG. 5, at block 510 (while pose tracking continues) the processor 200 receives a range measurement. Specifically, the range measurement is received at the processor 200 from the rangefinder 132. The range measurement can be received responsive to a trigger command (e.g. from the operator of the device 104), or can be requested automatically by the processor 200. That is, the rangefinder 132 can be instructed to generate range measurements at block 510 either in response to inputs in a manual measurement mode, or automatically in a continuous measurement mode (for example at a desired periodicity, such as any one of 10 Hz, 30 Hz, 60 Hz, or another suitable frequency).

The mode in which the device 104 operates can be selected, e.g. via the input 208, from options presented on the display 128 corresponding to the above-mentioned manual and continuous modes. In other examples, one or the other of the above modes can be omitted, and mode selection can therefore also be omitted. As will be discussed below in greater detail, the generation of dimensions varies depending on the mode in which the device 104 operates.

Figure 7:
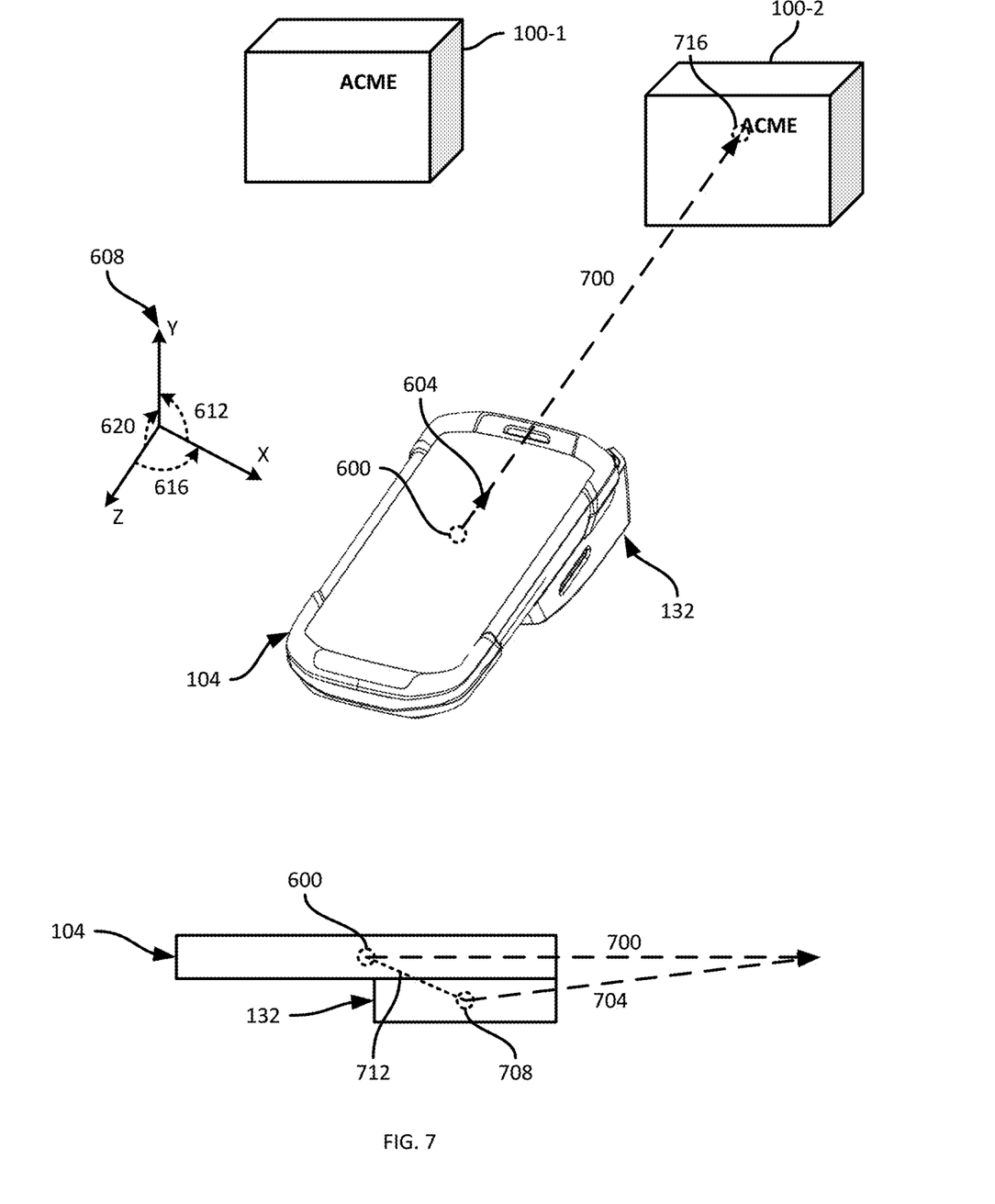
FIG. 7 is a diagram illustrating a performance of blocks 510 and 515 of the method of FIG. 5.

FIG. 7 illustrates a performance of block 510, in which the processor 200 obtains a range measurement 700 to the point 120 on the object 100-2, also shown in FIG. 1. The range 700 represents a distance between the reference origin of the device 104 (e.g. the location 600) and the external point. The data returned to the processor 200 from the rangefinder 132 may define the range 700 itself, or may define an intermediate measurement, such as a range 704 from the external point to a reference origin 708 of the rangefinder 132 itself, as shown in the side view in the lower portion of FIG. 7. The reference origin 708 is shown as the centroid of the rangefinder 132, but can also be any other point of the rangefinder 132 (e.g. a selected corner of the rangefinder 132). In such examples, the processor 200 retrieves (e.g. from the memory 204) calibration data defining a geometric transformation 712 between the range finder reference origin 708 and the location 600 of the reference origin of the device 104, to generate the range 700.

Returning to FIG. 5, at block 515 the processor 200 generates a position according to the frame of reference 608 for a first external point, based on the range received at block 510 and a current pose of the device 104. As noted earlier, the pose of the device 104 is tracked continuously. Therefore, at block 515 the processor 200 can also select one of the continuous sequence of poses being generated, for use in generation of the position at block 515. The selected pose may be selected, for example, to coincide in time with the range measurement received at block 510. Generation of the position at block 515 can be accomplished by, for example, extending a vector originating at the location 600, and oriented according to the orientation 604, by a distance equivalent to the range 700. A position 716, as shown in FIG. 7, is therefore obtained, in the frame of reference 608. The position 716 includes a set of three-dimensional coordinates (e.g. X, Y and Z coordinates in the frame of reference 608).

At block 520, the performance of the method 500 diverges depending on the active mode in which the device 104 is operating. When the device 104 is in a manual dimensioning mode (including embodiments in which the manual mode is the only mode), the performance of the method 500 proceeds to block 525. The continuous dimensioning mode will be discussed further below.

Figure 8:
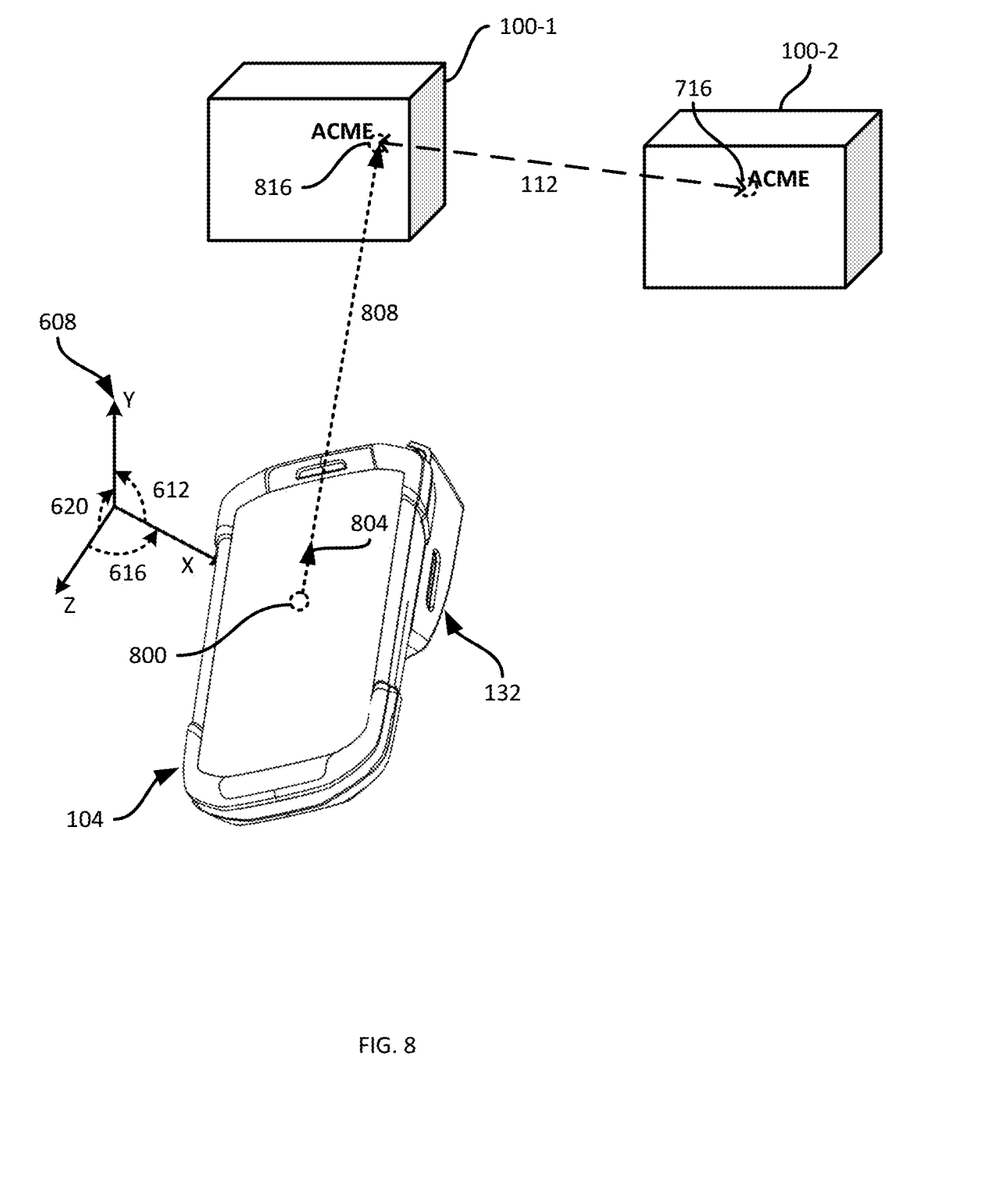
FIG. 8 is a diagram illustrating a further performance of blocks 510 and 515 of the method of FIG. 5.

At block 525, the device 104 determines whether a pair of positions have been generated through a corresponding pair of performances of blocks 510 and 515. When the determination at block 525 is negative, blocks 510 and 515 are repeated, as described above (while continuous pose tracking is performed via block 505). Turning to FIG. 8, a further performance of blocks 510 and 515 is illustrated. As shown in FIG. 8, the device 104 has been repositioned (e.g. via movement of the operator of the device 104) to point the laser of the rangefinder 132 at the external point 116 on the object 100-1. The current pose of the device 104 is represented in the frame of reference 608 by a position 800 of the device centroid, and an orientation 804. The rangefinder 132 returns, e.g. upon a further activation of the trigger input mentioned above, a range measurement 808. Based on the current pose of the device 104 (i.e. current at the time the range 808 is captured), the processor 200 generates a second position 816 in the frame of reference 608.

Returning to FIG. 5, a further performance of block 525 is affirmative, as two positions (716 and 816) have been generated. The processor 200 therefore proceeds to block 530. At block 530, the processor 200 generates a dimension based on the first and second positions obtained via successive performances of blocks 510 and 515 (and on corresponding device poses obtained via block 505). The dimension generated at block 530 is the distance between the positions from block 515. That is, the dimension in the present example performance of the method 500 is the distance 112, as shown in FIG. 8 (and also shown earlier in FIG. 1). The dimension generated at block 530 can be stored in the memory 204, presented on the display 128, or the like. In some examples, the device 104 includes an additional camera with a field of view encompassing the field of view of the rangefinder 132. In such examples, at block 530 the dimension can be presented on the display overlaid on an image depicting the object(s) dimensioned. In such examples, the above-mentioned camera can also be used as a viewfinder for aiming the rangefinder 132 at distant objects, on which the laser dot may not be visible to the naked eye.

At block 535, the device 104 determines whether an interrupt command has been received to terminate dimensioning. The interrupt can be a command received via the input 208. In other examples, the interrupt can be automatic, e.g. upon completion of block 530. When the determination at block 535 is negative, further positions of external points can be obtained and dimensioned as discussed above. When the determination at block 535 is affirmative, the performance of the method 500 ends.

Additional functionality implemented by the device 104 in the continuous dimensioning mode will now be described. As noted earlier, at block 520 the device 104 proceeds to block 525 when in manual mode. When the device 104 is operating in a continuous, or automatic, dimensioning mode, the device 104 proceeds instead from block 520 to block 540.

In the continuous mode, rather than receive a range measurement and generate a position corresponding to an external point in response to inputs (e.g. from the operator of the device 104), the processor 200 automatically triggers the rangefinder, e.g. at a predetermined frequency. The processor 200 also generates positions according to the frame of reference 608 for each captured range measurement. At block 540, the processor 200 determines whether to generate a dimension by determining whether the sequence of positions generated thus far corresponds to an adjacent pair of edges. When the determination is negative, the processor 200 continues collecting range measurements and generating positions for further external points. When the determination at block 540 is affirmative, however, the processor 200 proceeds to block 530, and generates a dimension between the above-mentioned pair of edges.

Figure 9:
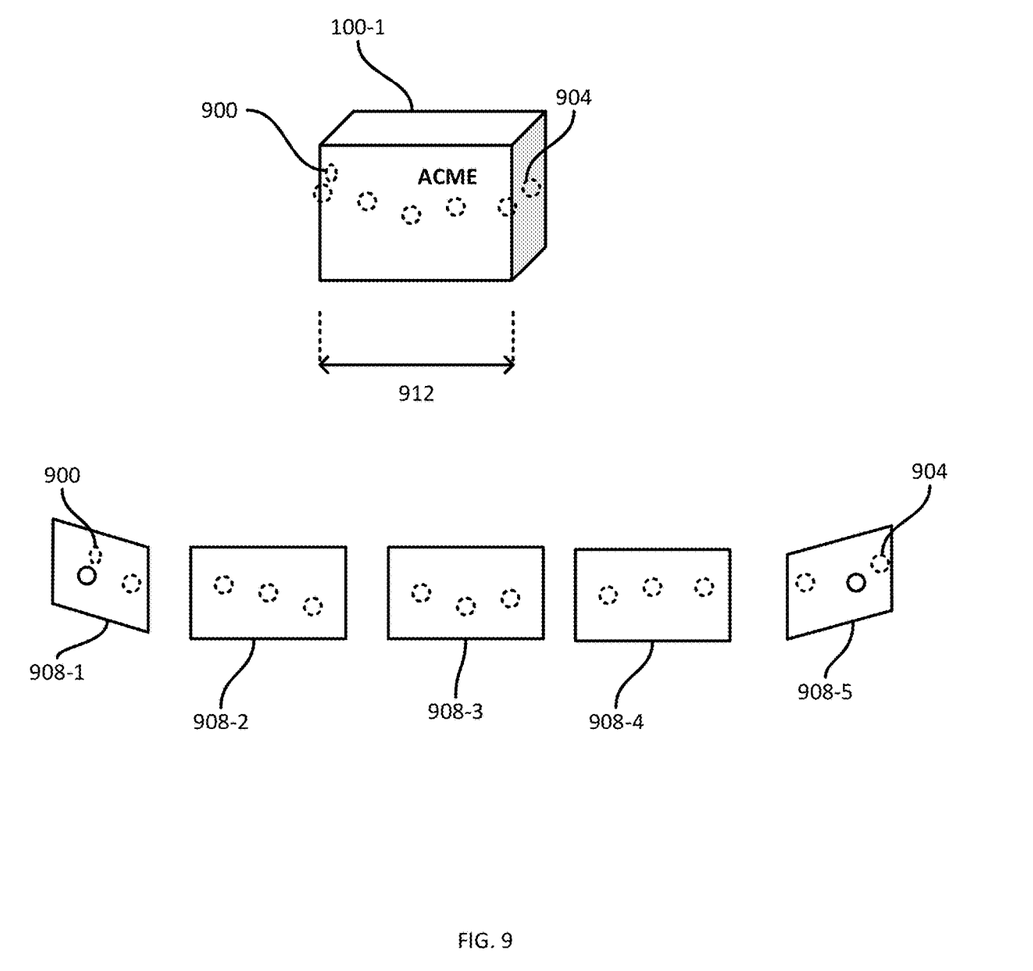
FIG. 9 is a diagram illustrating a performance of block 540 of the method of FIG. 5.

Various mechanisms may be employed by the processor 200 to detect edges based on the positions generated at successive iterations of block 515. Turning to FIG. 9, the object 100-1 is shown along with a set of positions corresponding to points on the object 100-1. The positions begin with a position 900 on the left surface of the object 100-1 (from the perspective of the reader), and end with a position 904 on the right surface of the object 100-1, traversing the front surface between the positions 900 and 904. In other words, to generate the plurality of positions shown in FIG. 9, the device 104 may be manipulated by the operator to sweep the beam 140 of the rangefinder 132 across the left, front and right surfaces of the object 100-1.

In some examples, the processor 200 detects edges from the positions generated via block 515 by fitting a plane to successive subsets of three positions. Thus, as shown in FIG. 9, successive planes 908-1, 908-2, 908-3, 908-4 and 908-5 are illustrated, each generated by fitting a plane to three adjacent positions. The trios of positions selected for the planes 908 are selected via a sliding window, such that two of the three positions in any given plane 908 are also present in the preceding plane 908, and two of the three positions are also present in the next plane 908. Plane fitting may be performed via any suitable algorithm, such as random sample consensus (RANSAC) or the like.

The processor 200 compares the orientations of each adjacent pair of planes (e.g. the planes 908-1 and 908-2), and determines whether the difference in orientation between the compared planes exceeds a threshold. For example, the threshold can be an angular threshold, such that if two planes diverge from parallel by more than the threshold (e.g. 10 degrees), the threshold is exceeded. If the difference in orientation does exceed the threshold, the planes are assumed to represent difference surfaces of an object, separated by an edge. When two edges are detected—in the present example, the edge dividing the planes 908-1 and 908-2, and the edge dividing the planes 908-4 and 908-5—the processor 200 selects positions corresponding to edges, and determines a dimension between the selected positions at block 530. The positions corresponding to edges can be selected, for example, by first selecting the outermost positions of the two adjacent planes 908 with differing orientations (e.g. the left-most position of the plane 908-1, and the right-most position of the plane 908-2). The processor 200 can then compute a location of an intersecting line between the planes 908-1 and 908-2, and select a position on the intersecting line with a minimum total distance to the above-mentioned outer-most positions. In other embodiments, where the sampling frequency is sufficiently elevated (e.g. 60 Hz) either of the outermost positions can simply be selected as the edge position. In the present example, the dimension corresponds to a width 912 of the object 100-1.

In further embodiments, in a continuous dimensioning mode the device 104 can also generate virtual models for objects being dimensioned via block 530. In particular, at block 530 the device 104 can generate a virtual surface based on the detected edges and the dimension therebetween. The virtual surface may be unbounded in certain directions (e.g. in the example shown in FIG. 9, the width 912 is available, but no height is yet known). Via the generation of further positions at block 515, e.g. responsive to a sweep of the device 104 from the rear surface, over the top surface, and along the front surface of the object 100-1 enables the device 104 to generate a further virtual surface corresponding to the top of the object 100-1. An intersection between the above virtual surfaces defines a height of the front surface. Additional sweeps of the device 104 across the other surfaces of the object 100-1 can be employed to generate further virtual surfaces representing the other sides of the object 100-1.

As will now be apparent, the above approach can also be employed to generate virtual surfaces corresponding to the interior of a room. The device 104 can be manipulated, for example, to sweep the beam 140 around the walls of the room (e.g. a generally horizontal sweep), and along the ceiling, floor and intermediate walls (e.g. a generally vertical sweep). The device 104 can then generate a set of virtual surfaces based on the detected edges of each wall, the floor and the ceiling.

As noted earlier, the dimensioning controller 200 can be implemented by either or both of the processor 200 and the rangefinder 132 (e.g. a specialized controller of the rangefinder 132). In some embodiments, the rangefinder 132 implements the dimensioning controller. The dimensioning controller therefore, obtains range measurements as described above, and also receives poses from the processor 200. The dimensioning controller then generates positions in the frame of reference based on the ranges and poses.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A mobile device, comprising:
    a tracking sensor;
    a controller connected with the tracking sensor, the controller configured to:
        track successive poses of the mobile device in a frame of reference via the tracking sensor;
        at a first one of the poses, receive a first range value indicating a first distance between the mobile device and a first external point;
        generate a first position, in the frame of reference, of the first external point based on the first range value and the first pose;
        at a second one of the poses, receive a second range value indicating a second distance between the mobile device and a second external point, and generate a second position, in the frame of reference, of the second external point based on the second range value and the second pose; and
        determine a distance between the first and second external points based on the first and second positions; and
    a rangefinder configured to measure the first and second range values between the mobile device and the first and second external points responsive to first and second activations of the rangefinder,
    wherein the controller is further configured to, prior to determination of the distance between the first and second external points, detect that the first and second external points correspond to respective edges of an item by:
        (a) fitting respective planes to each of a plurality of subsets of external points including the first external point and the second external point, and
        (b) detecting that a difference between orientations of the planes exceeds a threshold.

2. The mobile device of claim 1, wherein the tracking sensor includes an inertial measurement unit (IMU) and a camera; and
    wherein the controller is configured, in order to track successive poses of the mobile device, to:
        obtain motion data from the IMU;
        detect positions of features in successive images captured by the camera; and
        combine the motion data and the positions of the features.

3. The mobile device of claim 1, further comprising an input connected with the controller.

4. The mobile device of claim 3, wherein the first and second activations of the rangefinder are caused by respective commands received via the input.

5. The mobile device of claim 3 wherein the controller is further configured to receive a mode selection via the input, and to activate one of a continuous measurement mode and a manual measurement mode based on the mode selection.

6. The mobile device of claim 1, wherein the first and second activations of the rangefinder are caused automatically by the controller, responsive to operation of the mobile device in a continuous measurement mode.

7. The mobile device of claim 1, further comprising:
    a device housing supporting the controller and the tracking sensor; and
    an accessory housing supporting the rangefinder, wherein the accessory housing is removably coupled to the device housing.

8. The mobile device of claim 7, wherein the tracking sensor includes a camera, and wherein the accessory housing includes an opening therethrough disposed over the camera when the accessory housing is coupled to the device housing.

9. The mobile device of claim 7, further comprising a scanner supported by the device housing; wherein the accessory housing includes a cutout disposed over at least a portion of the scanner when the accessory housing is coupled to the device housing.

10. A method for mobile dimensioning at a controller of a mobile device, the method comprising:
    controlling a tracking sensor to track successive poses of the mobile device in a frame of reference;
    receiving a first range value indicating a first distance between the mobile device and a first point external to the mobile device;
    receiving a second range value indicating a second distance between the mobile device and a second point external to the mobile device;
    generating a first position, in the frame of reference, of the first external point based on the first range value and the first pose;
    generating a second position, in the frame of reference, of the second external point based on the second range value and the second pose;
    responsive to a first activation of a rangefinder of the mobile device at the first pose, controlling the rangefinder to measure the first range value;
    responsive to a second activation of the rangefinder at the second pose, controlling the rangefinder to measure the second range value; and
    prior to determining a distance between the first and second external points based on the first and second positions, detecting that the first and second external points correspond to respective edges of an item by:
        (a) fitting respective planes to each of a plurality of subsets of external points including the first external point and the second external point, and
        (b) detecting that a difference between orientations of the planes exceeds a threshold.

11. The method of claim 10, wherein the tracking sensor includes an inertial measurement unit (IMU) and a camera; and wherein the method further comprises:
    at the controller, tracking successive poses of the mobile device by detecting positions of features in successive images captured by the camera; and combining motion data from the IMU and the positions of the features.

12. The method of claim 10, further comprising, at the controller:
    receiving, from an input of the mobile device, respective commands corresponding to the first and second activations of the rangefinder.

13. The method of claim 10, further comprising, at the controller:

generating the first and second activations of the rangefinder automatically, responsive to operation of the mobile device in a continuous measurement mode.

14. The method of claim 13, further comprising, at the controller:

receiving a mode selection via an input of the mobile device; and activating one of the continuous measurement mode and a manual measurement mode based on the mode selection.

15. A mobile device, comprising:

a tracking sensor;

a rangefinder;

a controller connected with the tracking sensor and the rangefinder, the controller configured to:

track successive poses of the mobile device in a frame of reference via the tracking sensor;

at a first one of the poses, receive a first range value indicating a first distance between the mobile device and a first external point;

generate a first position, in the frame of reference, of the first external point based on the first range value and the first pose;

at a second one of the poses, receive a second range value indicating a second distance between the mobile device and a second external point, and generate a second position, in the frame of reference, of the second external point based on the second range value and the second pose; and determine a distance between the first and second external points based on the first and second positions, and prior to determination of the distance between the first and second external points, detect that the first and second external points correspond to respective edges of an item by:

(a) fitting respective planes to each of a plurality of subsets of external points including the first external point and the second external point, and (b) detecting that a difference between orientations of the planes exceeds a threshold a device housing supporting the controller and the tracking sensor; and an accessory housing supporting the rangefinder;

wherein, the accessory housing is removably coupled to the device housing, the tracking sensor includes a camera, the accessory housing includes an opening therethrough disposed over the camera when the accessory housing is coupled to the device housing.

16. A mobile device, comprising:

a tracking sensor;

a rangefinder;

a controller connected with the tracking sensor and the rangefinder, the controller configured to:

track successive poses of the mobile device in a frame of reference via the tracking sensor;

at a first one of the poses, receive a first range value indicating a first distance between the mobile device and a first external point;

generate a first position, in the frame of reference, of the first external point based on the first range value and the first pose;

at a second one of the poses, receive a second range value indicating a second distance between the mobile device and a second external point, and generate a second position, in the frame of reference, of the second external point based on the second range value and the second pose; and determine a distance between the first and second external points based on the first and second positions; and prior to determination of the distance between the first and second external points, detect that the first and second external points correspond to respective edges of an item by:

(a) fitting respective planes to each of a plurality of subsets of external points including the first external point and the second external point, and (b) detecting that a difference between orientations of the planes exceeds a threshold a device housing supporting the controller and the tracking sensor; and an accessory housing supporting the rangefinder;

wherein, the accessory housing is removably coupled to the device housing, the mobile device further comprising a scanner supported by the device housing, the accessory housing includes a cutout disposed over at least a portion of the scanner when the accessory housing is coupled to the device housing.

* * * * *